United States Patent Office 3,035,020
Patented May 15, 1962

3,035,020
PROCESS FOR PREPARING POLYCARBONATE RESINS
John S. Fry, Hillsborough Township, Somerset County, N.J., assignor to Union Carbide Corporation, a corporation of New York
No Drawing. Filed Apr. 6, 1959, Ser. No. 804,092
5 Claims. (Cl. 260—47)

This invention relates in general to the preparation of synthetic polymeric materials and more particularly to an improved process for preparing polycarbonate resins.

Heretofore several different general processes have been proposed which result in the formation of polycarbonates. Of particular interest has been the so-called direct phosgenation procedure in which a bisphenol is contacted with phosgene in the presence of an aqueous sodium hydroxide solution and an inert organic solvent such as methylene chloride. In the basic early embodiment of this general process, a (4,4'-dihydroxy-diphenyl)-alkane was initially charged to a reactor along with a stoichiometric excess of sodium hydroxide, a substantial quantity of methylene chloride which serves as a solvent for the intermediate low molecular weight polymer formed, and optionally a small amount of an antioxidant such as sodium hydrosulfite. Phosgene was added to this mixture in the reactor over a period of about two hours, while the temperature was maintained at 25° C.±2. The phosgenation reaction resulted in an intermediate low molecular weight polymer which was bodied by stirring with a quaternary ammonium catalyst under strongly basic, i.e., high pH, conditions. The pasty resin-solvent mass was washed with water, neutralized with a strong inorganic acid, rewashed, coagulated with ethanol, filtered and dried.

The afore-mentioned general process, however, has certain limitations and disadvantages which render commercial scale production inefficient, lacking in reproducibility, and hence expensive. For instance, the temperature control required to maintain the reaction system at close to 25° C. has been a difficult problem to deal with. Since the phosgenation reaction is highly exothermic, expensive and complex cooling apparatus are required. If the phosgenation period is protracted so that less heat is generated in the reactor in any given time interval, undesirable side reactions are favored which may lower the conversion rate of bisphenol to polycarbonate by as much as 30 percent. On the other hand if the temperature is permitted to rise in the reactor to the range of from about 32° C. to 40° C. the reaction is also non-selective in converting bisphenol to polycarbonate, and poor yields result.

In still other respects the prior known processes are unsatisfactory. Reproducibility, i.e., the ability to obtain a polymer having substantially the same molecular weight from batch to batch, even when the formulation and procedure are standardized, is difficult if not impossible to achieve. Although chain terminators such as monophenols have been employed to regulate the molecular weight of the final polymer, the actual molecular weight does not agree with the molecular weight calculated for the amount of monophenol used.

It is therefore the general object of this invention to provide a process for preparing polycarbonate resins which avoids the disadvantages of the prior known processes.

It is a particular object to provide a process for preparing polycarbonate resins which can be operated at reflux temperature conditions and still achieve a high percent reaction conversion.

It is another object to provide a process which has greater flexibility with respect to reaction variables without sacrificing yield to reproducibility.

These and other objects which will be apparent from the specification and appended claims are accomplished in accordance with the process of the present invention which comprises reacting a dihydric phenol with phosgene in the presence of an inert organic solvent, an aqueous solution of an alkali metal hydroxide, and in the presence of added neutral inorganic salt to form a relatively low molecular weight polycarbonate resin, and thereafter increasing the molecular weight of this intermediate polymer by contacting same with a bodying catalyst such as a compound in a strongly basic medium, and optionally a chain growth terminator, to form a polycarbonate having the desired molecular weight.

Although I do not wish to be bound by any particular theory, the improved results obtainable by the present invention are believed to be due primarily to a substantial lessening of the incidence of contact of phosgene with water or sodium hydroxide and hence an increased selectivity of contact between phosgene and the sodium salt of the bisphenol compound. The reaction mixture consists substantially of two liquid phases, i.e., an aqueous phase and an organic solvent phase. Since phosgene has greater solubility in the organic solvent than in water, and since the sodium salt of the bisphenol has greater solubility in water than in the organic solvent, contact between the reactants is made largely through the interface between the two phases. In conventional prior art processes, however, the organic solvent phase does contain some dissolved water and sodium hydroxide thereby facilitating the undesirable reaction of phosgene with water and sodium hydroxide. By adding a neutral inorganic salt inert to the reactants according to the present invention, the solubility of the two phases in each other is substantially lessened with consequent greater reaction specificity between phosgene and the sodium salt of the bisphenol employed.

In carrying out my process it is not necessary that all of the sodium hydroxide to be added be contained in the initial charge to the reactor especially if the total amount is to exceed the stoichiometric requirements. The use of a stoichiometric excess of as much as 50 percent is conventional practice in the art to insure a quantitative conversion in the first instance of the bisphenol to its corresponding disodium salt. I therefore prefer in my process that from about 120 percent to about 150 percent of the stoichiometric amount of sodium hydroxide be incorporated into the reaction mass prior to completion of the phosgenation reaction whether it is added all at once or in two or more portions. Although the mode of addition of the sodium hydroxide is not narrowly critical, the preferred procedure is dependent in the main upon the length of the phosgenation period and upon the temperature. When the phosgenation period is about 3 hours or less and the reaction temperature is between about 20° C. and 30° C. it has been found that from 20 percent of the theoretical amount to 150 percent or more, preferably 100 percent, may be initially charged to the reactor with the remainder, if any, being added during the phosgenation period in such a way as to maintain the pH of the reaction mass in the range of from about 9 to about 12 during the major part of the reaction period.

When the temperature of the reaction mass is maintained at from about 30° C. up to reflux conditions (~40° C. when the inert organic solvent is methylene chloride) and the phosgenation period is 3 hours or less, an initial charge of sodium hydroxide of from about 70 percent to about 110 percent of theoretical is satisfactory, but preferably about 95 percent is initially charged with the remaining 5 to 45 percent, preferably 30 percent, being added subsequently when the pH of the reaction mass is between 9 and 12.

When the phosgenation period is extended beyond about 3 hours, the temperature is preferably restricted to the range of about 20° C. to about 30° C. with about 90 percent to 100 percent of the theoretical quantity of sodium hydroxide being added initially and a remainder of about 30 percent being added subsequently in two equal charges so that the pH range is maintained within 9 to 12 during the major part of the reaction period.

The neutral inorganic salts suitable for use in the present invention comprise a large class of well-known chemical compounds which are not necessarily closely related in the chemical sense except that they have in common the property of being water soluble and substantially inert to the ingredients of the reaction mixture and especially to phosgene. Typical of such salts are the alkali metal salts of strong mineral acids, as for example, potassium chloride, lithium chloride, sodium chloride, potassium nitrate, potassium sulfate, sodium sulfate, sodium nitrate and the like. Sodium chloride is particularly preferred.

The addition of the neutral inorganic salts is most effective when accomplished prior to the addition of phosgene. Advantageously the neutral salt selected is included in the initial charge to the reactor along with the bisphenol, water, organic solvent, and sodium hydroxide. It will be obvious to those skilled in the art, however, that a considerable degree of benefit may be obtained even if the salt is added soon after the start of the phosgenation reaction. The addition of the neutral salt has been found to be beneficial even when added to the reaction mixture as late after initiation of phosgenation up to the point at which about 60 percent of the stoichiometric amount of phosgene has been added. For this reason such delayed salt addition is considered to be within the spirit and scope of the present invention.

The most substantial benefit is derived from my improved process if the neutral salt is present throughout the phosgenation reaction period in an amount of at least about 20 percent by weight based on the weight of bisphenol reactant initially charged. It is preferable that at least about 25 to 28 percent salt by weight be present. As will be readily obvious, however, lesser amounts of added neutral salt are effective, although to a lesser degree, and are therefore considered as being within the scope of the invention. Amounts of added salt in excess of 28 percent by weight based on the weight of initially charged bisphenol can of course be used without difficulty, but it has been found that no significant additional benefit is obtained by using these larger amounts.

The procedure set forth in the foregoing description is generally applicable for the preparation of all polycarbonate polymers and copolymers. Thus any of the dihydric phenols, particularly (4,4'-dihydroxy-diphenyl)alkanes having from one to six carbon atoms in the central alkane group; the bisphenols of acetophenone, acetaldehyde, propionaldehyde and the like; resorcinol, hydroquinone, particularly in admixture with (4,4'-dihydroxy-diphenyl) alkanes; and the alkylated and halogenated analogues of the compounds may suitably be phosgenated to form polycarbonates according to this process.

Illustrative of the broad class of dihydric phenols which may suitably be employed in the practice of this invention are (4,4'-dihydroxy-diphenyl)-methane; 2,2-(4,4'-dihydroxy-diphenyl) propane; 1,1(4,4'-dihydroxy-diphenyl) cyclohexane; 1,1(4,4'-dihydroxy-3,3'-dimethyl diphenyl) cyclohexane; 1,1-(2,2'-dihydroxy-4,4'-dimethyl-diphenyl) butane; 2,2-(2,2'-dihydroxy-4,4'-di-tert-butyl-diphenyl)propane; 1,1 - (4,4'-dihydroxy - diphenyl) - 1 - phenylethane; 2,2-(4,4-dihydroxy-diphenyl)butane; 3,3 (4,4'-dihydroxy-diphenyl) pentane; 2,2-(4,4'-dihydroxydiphenyl)-hexane; 3,3(4,4'-dihydroxy-diphenyl) hexane; 2,2(4,4' - dihydroxy-diphenyl) tridecane; 2,2'(4,4'dihydroxy-3'-methyl-diphenyl) propane; 2,2(4,4'-dihydroxy-3-methyl-3'-isopropyl-diphenyl) butane; 2,2-(3,5,3',5'-tetrachloro-4,4'-dihydroxy-diphenyl) propane; 2,2-(3,5,3',5'-tetrabromo-4,4'-dihydroxy-diphenyl) propane; (2,2'-dihydroxy-5,5'-difluoro-diphenyl)methane; (4,4'-dihydroxy-diphenyl)-phenyl-methane; 1,3-dihydroxybenzene and 1,4-dihydroxy benzene; and mixtures thereof.

These dihydric phenols and others of the same class are well-known in the art and have frequently been employed in the production of polycarbonate resins by prior known processes.

Although the process has been described above as using an aqueous sodium hydroxide solution, other alkali metal or alkaline earth bases may suitably be employed such as lithium-, potassium-, or calcium hydroxide or carbonate.

Inert organic solvents which can suitably serve as solvents for the phosgene reactant include cyclohexane, methyl cyclohexane, benzene, toluene, xylene, chloroform, methylene chloride and trichloroethylene. Methylene chloride is especially suitable and is preferred when the reaction is carried out under reflux temperature conditions, i.e., about 39.5° C.

The following examples will illustrate the process of preparing polycarbonate resins in accordance with the invention and some of the many modifications that can be made in this process within the scope of the invention. As will be seen from these examples, it is possible to prepare a polycarbonate polymer which has substantially the same molecular weight from batch to batch even though wide variation in such variables such as temperature and reactant formulation exist. The molecular weight of the polymers produced in these examples is indicated by the reduced viscosity given for each. By the term reduced viscosity in this application is meant the viscosity determined on a 0.2 percent solution of the final polymer in methylene chloride, containing 0.2 gram of polymer per 100 ml. of solution, at 25° C. All parts and percentages are by weight unless otherwise indicated.

*Example 1*

(A) A 2 liter reactor equipped with a sealed stirrer, reflux condenser, thermometer, gas inlet tube, pH meter electrodes, and a dropping funnel was purged with nitrogen and charged with 125 grams 2,2(4,4'-dihydroxy-diphenyl)-propane, 0.11 gram of an antioxidant (sodium hydrosulfite), 55.0 grams of sodium hydroxide dissolved in 591 grams of water, 550 grams of methylene chloride, 35 grams of sodium chloride, and 1.17 grams of phenol. Holding the mixture at 25° C.±2° C., phosgene was bubbled into the reactor. The initial pH was about 13.2. Strong agitation was maintained. Phosgene addition was continued until a pH of the reaction mass had decreased to about 7. Total reaction time was 1 hour and 41 minutes. Approximately 72 grams $COCl_2$ was needed. At this point, NaOH (30 grams) in water (30 grams) was added. After again cooling the reaction to 35° C., benzyltrimethyl ammonium chloride (4.58 grams, 60 percent aqueous solution) was added and the reaction mixture was stirred vigorously for one hour between 25° C. and 35° C. The two layers were allowed to settle, and the aqueous layer was decanted off. The polymer solution was washed three times with water, 500 ml., and then stirred with dilute HCl (500 ml.~2 percent) until it was neutral or acidic to litmus. Solvent-polymer mass was washed further with water and finally coagulated by slowly pouring into isopropanol (1,600 ml.) in a Waring Blendor. The coagulated polymer was filtered and dried in an oven (100° C.) for about 15 hours. Conversion yield 138 grams; measured reduced viscosity was 0.63 (0.2 g./100 ml. methylene chloride at 25° C.). Theoretical reduced viscosity was 0.5. No unreacted bisphenol remained.

The effectiveness of the initially charged sodium chloride as shown in part (A) above is clearly demonstrated by comparison with part (B) below in which no sodium chloride was initially charged to the reactor.

(B) Part (A) above was repeated except that no NaCl was added to the reactor at any time. In all other respects the formulation, procedure and reaction conditions were unchanged. The final polymer had a reduced viscosity (0.2 g./100 ml. methylene chloride at 25° C.) of 0.92. Theoretical reduced viscosity based on the amount of phenol chain terminator used (1.17 g.) was 0.5. Approximately 1 gram of unreacted bisphenol was recovered from the reaction mass.

It is readily seen that the difference between the actual reduced viscosity of the polymer and the calculated theoretical reduced viscosity of the polymer in part (A) is about 0.13, whereas the difference between the actual and theoretical reduced viscosity values of the polymer in part (B) is about 0.42.

Example II

A reactor such as described in Example I(A) was purged with nitrogen and charged with 125 grams 2,2-(4,4'-dihydroxy-diphenyl)-propane, 0.11 gram of sodium hydrosulfite, 46.6 grams of sodium hydroxide dissolved in 429 grams of water, 550 grams of methylene chloride, and 35 grams of sodium chloride. A solution of sodium hydroxide (8.4 grams in 62 grams of $H_2O$) was placed in the dropping funnel. While the mixture was maintained at 35° C.±2, phosgene was bubbled into the reactor. The initial pH was about 13.2. The reaction mixture was strongly agitated throughout the course of the reaction. When the pH of the reaction mixture had decreased to about 11, the caustic solution in the dropping funnel was added over a period of about 4 minutes. Phosgenation was continued until the pH of the reaction mixture had again dropped to about 7. Total reaction time was 1 hour and 30 minutes. Approximately 72 grams of phosgene was required for the entire reaction. At this point, NaOH (30 grams) in water (30 grams) was added. After again cooling the reaction to 35° C., benzyltrimethyl ammonium chloride (4.58 grams, 60 percent aqueous solution) was added and the reaction mixture was stirred vigorously for one hour between 25° C. and 35° C. The two layers were allowed to settle, and the aqueous layer was decanded off and replaced with water (500 grams). The polymer solution was again washed three times with water 500 ml. and then stirred with dilute hydrochloric acid (500 ml.~2 percent) until it was neutral or acidic to litmus. Solvent-polymer mass was washed further with water and finally coagulated by slowly pouring into isopropanol (1,600 ml.).

Example III

Example II was repeated except for the following modifications: The phosgenation reaction temperature was maintained at 25° C.±2° C.; the period during which phosgene was introduced into the reactor was one hour and 40 minutes; 55 grams of sodium hydroxide (125 percent of stoichiometric amount) in 591 grams of water was charged to the reactor initially. No additional caustic was added during phosgenation; 1.17 grams of phenol was initially charged. 138 grams of final polymer having a reduced viscosity of 0.63 was obtained. Theoretical reduced viscosity based on the amount of phenol chain terminator employed was 0.5.

Example IV

Example II was repeated except for the following modifications: The phosgenation reaction temperature was maintained at 25° C.±2; the phosgenation period was one hour and 37 minutes; 44 grams of sodium hydroxide (100 percent of stoichiometric amount) in 509 grams of water was initially charged to the reactor. Eleven additional grams of NaOH (25 percent of stoichiometric) in 82 grams of water was added to reactor during the phosgenation reaction when the pH had reached 7; phenol (1.17 grams) was initially charged. 138 grams of final polymer having a reduced viscosity of 0.61 was obtained. Theoretical reduced viscosity based on the amount of phenol chain terminator employed was 0.5.

Example V (A) The general procedure of Example II was repeated using the following formulation and conditions.

Initial charge to reactor:                                    Grams
   2,2(4,4'-dihydroxy-diphenyl)propane _____ 125
   NaOH (aqueous sol. 591 g. $H_2O$) _____ 55
   NaCl _____ 35
   Sodium hydrosulfite (antioxidant) _____ 0.11
   Methylene chloride _____ 550
Subsequently added:
   Phosgene _____ 72
Conditions:
   Reactor temperature during phosgenation 35° C.±2° C. Phosgene addition time was 1 hour and 51 minutes.

The final polymer yield was 136 grams and the reduced viscosity of the polymer was 1.3 percent. Percent bisphenol unreacted, none.

(B) Part (A) above was repeated except that no NaCl was added to the reactor at any time. In all other respects the formulation, procedure and reaction conditions were unchanged. The final polymer had a reduced viscosity of 0.68 and 11.2 percent of the initially charged bisphenol was recovered unreacted.

Example VI

The suitability of using reflux temperature conditions during the phosgenation operation in accordance with the process of the present invention was demonstrated by following the general procedure of Example II using the following formulation and conditions:

Grams
   2,2(4,4'-dihydroxy-diphenyl)propane _____ 125
   NaOH (aqueous sol. 509 grams $H_2O$) _____ 44
   NaCl _____ 35
   Sodium hydrosulfite (antioxidant) _____ 0.11
   Methylene chloride _____ 550
Subsequently added:
   Phosgene _____ 72
   NaOH (aqueous sol. 81 grams $H_2O$) added when pH of reaction mix=11 _____ 11
Conditions:
   Reactor temperature during phosgenation 39.5° C. (reflux). Phosgene addition time was 1 hour and 18 minutes.

The final polymer yield was 137 grams and the reduced viscosity of the polymer was 1.67. Percent bisphenol unreacted, none.

It will be obvious to those skilled in the art that numerous modifications may be made in the present invention without departing from the proper scope of the invention. The amount of water initially charged to the reactor, for instance, is by no means critical and may be considerably more or less than shown in the examples without adversely affecting the course of the reaction. In another instance, the concentration of the sodium hydroxide solution which is introduced into the reactor simultaneously with the phosgene is also not critical. If the concentration of sodium hydroxide in this solution is quite large, the solution is viscous and not so easily metered. If the concentration is quite low, needless enlargement of the reactor may be required to accommodate the large amount of solution required. For these reasons the preferred concentration of the solution is from about 20 to about 40 percent sodium hydroxide.

Reaction temperatures in the range of about 20° C. to about 40° C. have been found to be the most suitable for the process, although operation at either above or below this range can be accomplished by the skilled operator and is intended to be within the contemplated scope of the invention.

In bodying the intermediate polymer into a higher molecular weight polymer, conventional procedures can be employed which are well known in the art. The most satisfactory method has been found to be stirring the intermediate polymer in the presence of a strong sodium hydroxide solution and a quaternary ammonium salt. The quantity of each of these bodying agents is not critical. For speed and efficiency of operation, however, it is preferred to use 16 parts by weight of NaOH per 100 parts by weight of the initial bisphenol or corresponding diphenol used. For like reasons, 0.0125 to about 0.05 mole of the quaternary ammonium catalyst per mole of initial diphenol is preferred, although much larger amounts may be employed without harmful results so long as the final polymer is not permitted to stand in contact with the unused catalyst for protracted periods of time.

Where chain length control is desired, any of the well known compounds functioning as such are entirely suitable. Particularly satisfactory are those categorized as monophenols, such as p-phenylphenol o-chlorophenol, and p-tert.butylphenol.

It is believed the process disclosed herein provides advantages which are not in the aggregate available in any other known method. These advantages include a more exact control over the course of the phosgenation step—thus greater reproducibility; greater assurance of the completeness of the reaction; a substantially lessened extent of side reaction occurence with consequently increased efficiency of operation; and the surprising capability of the process to function well at temperatures 10° C. or more higher than heretofore feasible with prior processes.

What is claimed is:

1. The process for preparing substantially linear thermoplastic polycarbonate resins which comprises reacting phosgene with a dihydric phenol in a reaction medium comprising an aqueous solution of an alkali metal hydroxide, an inert organic solvent, and a water soluble salt of an alkali metal and a strong mineral acid, said water soluble salt being present substantially throughout the reaction period in an amount of at least 20 weight percent based on the weight of dihydric phenol initially present and being exclusive of any inorganic salt formed in situ as a result of the reaction of phosgene with the alkali metal salt of the said dihydric phenol.

2. The process for preparing substantially linear thermoplastic polycarbonate resins which comprises reacting phosgene with a gem-bis(hydroxyphenyl)alkane in a reaction medium comprising an aqueous solution of an alkali metal hydroxide, an inert organic solvent, and a water soluble salt of an alkali metal and a strong mineral acid, said water soluble salt being present substantially throughout the reaction period in an amount of at at least 20 weight percent based on the weight of gem-bis(hydroxyphenyl)alkane initially present and being exclusive of any inorganic salt formed in situ as a result of the reaction of phosgene with the alkali metal salt of said gem-bis(hydroxyphenyl)alkane.

3. The process according to claim 2 wherein the gem-bis(hydroxyphenyl)alkane is 2,2(4,4'-dihydroxy diphenyl)propane and the water soluble inorganic salt is sodium chloride.

4. The process according to claim 3 wherein the reaction temperature is from about 30° C. to about 40° C.

5. In the process for preparing a substantially linear thermoplastic polycarbonate resin which comprises admixing a gem-bis(hydroxyphenyl)alkane with an aqueous solution of an alkali metal hydroxide and an inert organic solvent, and thereafter introducing phosgene into the mixture thus formed, the improvement which includes the step of adding to the reaction mixture a water soluble neutral salt of an alkali metal and a strong mineral acid, said salt being employed in an amount of at least about 25 weight percent based on the weight of dihydric phenol initially present, said addition of said salt being completed prior to the time at which about 60 percent of the stoichiometric amount of phosgene has been introduced, and said salt which is added being exclusive of any salt formed in situ in the reaction mixture.

References Cited in the file of this patent

UNITED STATES PATENTS 2,816,879     Whittbecker _____ Dec. 17, 1957

FOREIGN PATENTS 546,375     Belgium _____ July 15, 1956